Oct. 9, 1945.　　　　E. K. KAPRELIAN　　　　2,386,614
RANGE FINDER
Filed July 11, 1944
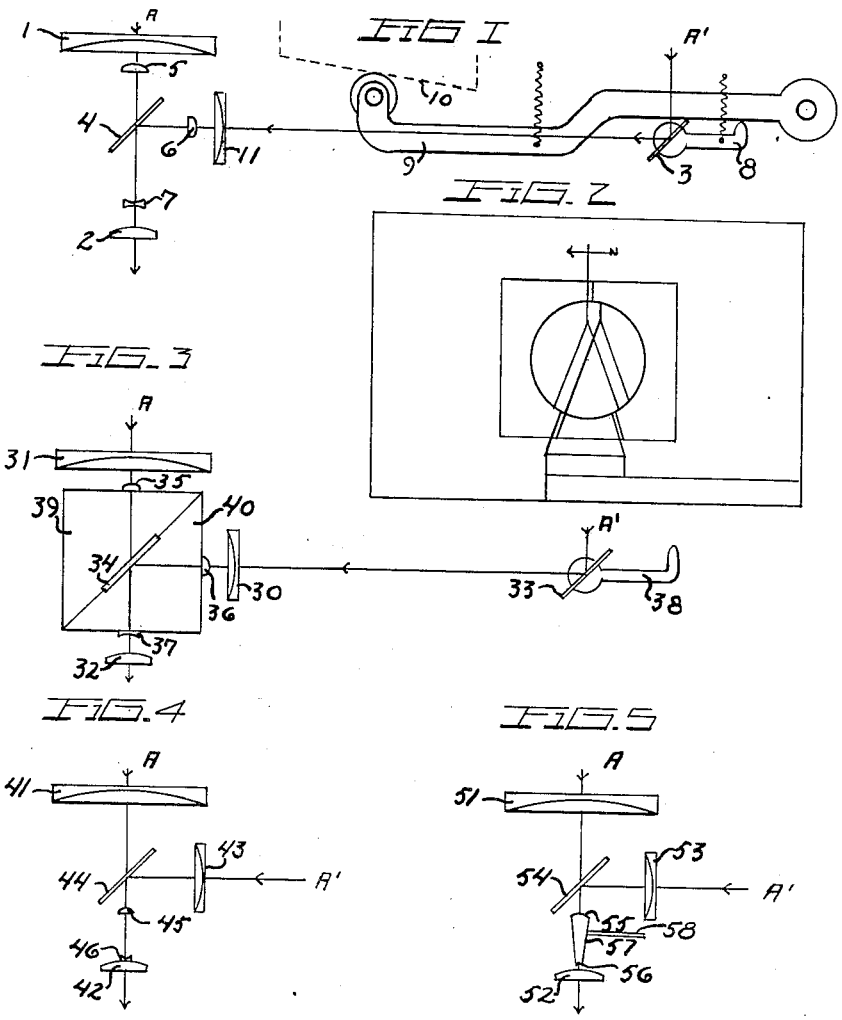
Edward K. Kaprelian
Inventor Patented Oct. 9, 1945

2,386,614

UNITED STATES PATENT OFFICE 2,386,614

RANGE FINDER

Edward K. Kaprelian, Alexandria, Va.

Application July 11, 1944, Serial No. 544,366

9 Claims. (Cl. 88—2.4)

This invention relates to a combined view and rangefinder and to an optical system whereby the rangefinder image is enlarged with respect to the viewfinder image.

In all combined view and range finders such as are used with miniature cameras the scene to be photographed is seen in reduced size through an inverted Galilean system, the virtual image formed by the front negative lens being brought to a comfortable viewing distance by the positive eyepiece lens. The indirect beam is usually brought into the center of the viewfinder field by means of a reflecting mirror and a semitransparent mirror fixed at a 45° angle between the elements of the Galilean system. In such systems of the prior art both the viewfinder image and the rangefinder image are reduced by about one half. As a result the optical base of the rangefinder is about half the mechanical base and the accuracy of focusing is reduced proportionately.

It is an object of this invention to provide means whereby part of the rangefinder image is enlarged to unit magnification or larger.

It is a further object of this invention to provide means for introducing or removing the image enlarging means at will, thereby permitting the view and rangefinder system to operate either as a normal system or as a magnifying system.

Other objects and advantages of the invention will become apparent from the following description when read in connection with the accompanying drawing in which:

Fig. 1 shows a view and range finder system according to the invention.

Fig. 2 shows the appearance of a subject as viewed through the view and rangefinder system described.

Fig. 3 shows a modification of the system in Fig. 1 in which a pair of cemented prisms are employed.

Fig. 4 shows a further modification of the optical arrangement of the rangefinder.

Fig. 5 shows a still further modification of the system.

Fig. 1 shows a viewfinder portion consisting of an inverted Galilean system including a negative front element 1 and a positive eyepiece 2. Light from the subject enters the finder system as at A, and also enters a deflecting mirror 3 as at A'.

Light striking mirror 3 is deflected through a negative lens 11 to a semi transparent mirror 4 where rays A and A' combine and enter eyepiece 2. Lenses 1 and 11 are of the same power and are located equidistantly from mirror 4 as in the usual rangefinder of this type. A cam surface 10 carried by the camera lens, not shown, presses against a roller carried by arm 9 which in turn moves mirror 3 carried on arm 8.

Interposed between negative lenses 1 and 11 and mirror 4 are positive lenses 5 and 6 respectively. These lenses are small in diameter as compared to lenses 1 and 11 and comprise the objective lenses of a supplementary, internal Galilean system. Lens 7 comprises the eyepiece of this system. Some of the light rays entering lenses 1 and 11 will pass through lenses 5 and 6 and will pass through lens 7 and through eyepiece 2. Thus, the central portion of the rangefinder image will be magnified. The lenses 5, 6 and 7 of the internal Galilean system may be of such power as to result in unit magnification at the center of the field or may be altered to yield a final magnification greater or less than unity.

Figure 2 shows the appearance of a subject within the field of view of the rangefinder which is the subject of this invention. The scene to be photographed falls within the larger rectangle while the rangefinder image appears within the smaller rectangle, as in the usual combined rangefinder and viewfinder. Part of the rangefinder image is enlarged by the internal Galilean system as is shown within the circle. Although some of the field is lost due to the magnification of the internal Galilean system a slight shifting of the eye behind the eyepiece lens will permit the eye to see around the rear (negative) lens of the internal Galilean system and to thereby see all parts of the scene to be photographed. Also, as explained below regarding Fig. 5 the internal Galilean system may be pivoted or dropped out of the way when desired.

Figure 3 shows a modification in which a pair of cemented prisms are placed within the inverted Galilean finder system having a negative front lens 31 and a positive eyepiece 32. Light from the subject as at A' enters deviating mirror 33 supported on arm 38 and is diverted through negative lens 30 and into a 45° prism 40 where it strikes a semi reflecting surface 34 and is directed into eyepiece 32, joining ray A which has passed through lens 31, and prisms 39 and 40. Lenses 31 and 30 are of equal power and are spaced equidistantly from surface 34. Part of the light entering lens 31 passes through positive lens 35 and part of the light entering lens 30 passes through positive lens 36, lenses 35 and 36 comprising the objectives of an internal Galilean system of which 37 constitutes the eyepiece. In operation the modification of Fig. 3 is identical to Fig. 1, the main advantage residing in the fact that the prisms provide convenient, accurate supporting means for the mirror 34 and the three lenses comprising the internal Galilean system. In this modification the number of glass-air refracting surfaces is reduced to a minimum. The prisms and their attached lenses are easily mounted in the rangefinder.

In the modification of Fig. 4 light from the object enters lens 41 directly and lens 43 indirectly (after being diverted by a mirror, not shown). The rays are combined at semi-transparent mirror 44 and leave through eyepiece some of this light entering a small internal Galilean system comprising lenses 45 and 46 placed between the mirror 44 and eyepiece 42. In this modification, although the internal Galilean system has not been divided and placed before and behind the semi-transparent mirror, the optical characteristics remain the same. Lens 46 may be cemented to eyepiece 42 for convenience. Lens 45 may be cemented to a sheet of glass or transparent plastic for support.

The modification of Fig. 5 is similar to Fig. 4 in that lenses 51, 53 and 52 and mirror 54 are identical to the corresponding elements in Fig. 4. The Galilean system 45—46 of Fig. 4 is replaced in this modification by member 57 which may be made of glass or of any well known transparent plastic material of suitable optical characteristics. Member 57 carries a collective surface 55 facing the mirror 54 and a relatively deep negative surface 56 facing eyepiece 52. Member 57 may be swung out of position and out of the field of view when desired by any convenient mechanical linkage connected to arm 58. Preferably the arrangement should be such that when pressure such as the user's finger is applied to the focusing knob or wheel, member 57 will be moved into the position shown in Figure 5. The magnifying effect of member 57 then aids in obtaining sharp focus. When the user's finger is removed from the focusing knob member 57 is returned to its inoperative position by gravity or preferably by a spring.

What I claim as my invention is:

1. In a combined view finder and range finder of the coincidence type, a partially reflecting ray dividing surface, an inverted Galilean view finder system having its negative element situated before the ray dividing surface and its positive element behind said surface, a movable mirror displaced from the view finder system and forming with said system the base for the range finder, a negative lens having the same power and spacing from said ray dividing surface as said view finder negative lens and located between said movable mirror and said ray dividing surface and acting to diverge light directed by the mirror to said ray dividing means, and an afocal magnifying system of the positive Galilean type comprising at least one positive and one negative lens enclosed within the range finder system to magnify corresponding parts of the central portions of the range finder images.

2. A combined view finder and range finder as claimed in claim 1 in which the afocal magnifying system comprises a positive lens placed behind the negative element of the inverted Galilean view finder, a positive lens placed behind said negative lens which cooperates with the movable mirror and a negative lens placed before the positive element of the inverted Galilean view finder system.

3. A combined view finder and range finder as claimed in claim 1, said ray dividing surface being formed at the diagonal surface of a pair of 45° prisms, the lenses of the afocal magnifying system being attached to the faces of the prisms.

4. A combined view finder and range finder as claimed in claim 1 in which the afocal magnifying system comprises a solid pencil of refractive material having a positive front surface and a negative rear surface and located between the ray dividing surface and the positive eyepiece of the inverted Galilean view finder eyepiece.

5. A combined view finder and range finder as claimed in claim 1 in which the afocal magnifying system comprises a solid pencil of refractive material having a positive front surface and a negative rear surface and located between the ray dividing surface and the positive eyepiece of the inverted afocal magnifying view finder eyepiece, said Galilean pencil being movable into and out of the field of view of the view finder system.

6. In a combined view finder and range finder of the coincidence type, a partially reflecting ray dividing surface, an inverted Galilean view finder system having its negative element situated before the ray dividing surface and its positive element behind said surface whereby direct beams from an object pass through the negative lens and mirror and through the positive lens, a movable mirror displaced from the view finder system and forming therewith the base for the range finder, said movable mirror directing deviated beams from an object toward said partially reflecting ray dividing surface where said direct and deviated beams combine, a negative lens between said movable mirror and said ray dividing surface, said negative lens being equal in power and smaller in size than the negative element of said inverted Galilean view finder system and being spaced from said ray dividing surface equidistantly with the negative element of said inverted Galilean view finder system, and afocal magnifying means of the Galilean type enclosed within the range finder system whereby corresponding portions of the images formed by the direct and deviated beams of the range finder are magnified, the lenses of said afocal magnifying system being smaller than the lenses of the view finder and range finder, whereby only a portion of the view finder field is magnified.

7. In a combined view finder and range finder of the coincidence type, a partially reflecting ray dividing surface, an inverted Galilean view finder system having its negative element situated before the ray dividing surface and its positive element behind said surface whereby direct beams from an object pass through the negative lens and mirror and through the positive lens, a movable mirror displaced from the view finder system and forming therewith the base for the range finder, said movable mirror directing deviated beams from an object toward said partially reflecting ray dividing surface where said direct and deviated beams combine, a negative lens between said movable mirror and said ray dividing surface, said negative lens being equal in power and smaller in size than the negative element of said inverted Galilean view finder system and being spaced from said ray dividing surface equidistantly wtih the negative element of said inverted Galilean viewfinder system and an afocal magnifying system of the Galilean type enclosed within the range finder system through which both the direct and deviated beams pass whereby both images of the range finder are magnified, the lenses of said magnifying system being smaller than those of said view finder whereby the range finder images cover a smaller angular field than said viewfinder images.

8. In a combined view finder and range finder of the coincidence type, a partially reflecting ray dividing surface, an inverted Galilean view finder system having its negative element located before the ray dividing surface and its positive element behind said surface, a movable mirror displaced from the viewfinder system and forming with said system the base for the rangefinder, a negative lens located between said mirror and said ray dividing surface and having the same power and separation from said ray dividing surface as said viewfinder negative lens and an afocal magnifying system centered with respect to the rangefinder system and acting to magnify corresponding portions of the images formed by the rangefinder, the lenses of said magnifying system being smaller than the elements of the rangefinder whereby only the central portion of the field seen through the rangefinder is magnified.

9. In a combined viewfinder and rangefinder of the coincidence type having a partially reflecting ray dividing surface, an inverted Galilean viewfinder system having its negative lens in front of and its positive lens in back of said ray dividing surface, a movable mirror displaced from the viewfinder system and forming with said system the base for the rangefinder and a negative lens located between said mirror and said ray dividing surface and having the same power and separation from said ray dividing surface as said viewfinder negative lens, magnifying means for enlarging a portion of the rangefinder field comprising an afocal magnifying system of the Galilean type placed in axial alignment within the rangefinder system and having lenses smaller in size than the rangefinder elements.

EDWARD K. KAPRELIAN.